United States Patent [19]

Fuchsluger

[11] Patent Number: 4,470,646
[45] Date of Patent: Sep. 11, 1984

[54] ROLLING CONTACT BEARING WITH THREADED PLANET ROLLERS AND PLAY CANCELLING DEVICE

[75] Inventor: Gérard Fuchsluger, Buchillon, Switzerland

[73] Assignee: Rollvis S.A., Geneva, Switzerland

[21] Appl. No.: 522,625

[22] Filed: Aug. 12, 1983

Related U.S. Application Data

[62] Division of Ser. No. 243,650, Mar. 17, 1981, abandoned.

[30] Foreign Application Priority Data

Oct. 9, 1980 [CH] Switzerland .......................... 7535/80

[51] Int. Cl.³ .............................................. F16C 19/50
[52] U.S. Cl. ................................. 308/205; 308/207 A
[58] Field of Search .............. 308/199, 200, 205, 206, 308/207 R, 207 A, 215, 189 A

[56] References Cited

U.S. PATENT DOCUMENTS

| | | | |
|---|---|---|---|
| 854,505 | 5/1907 | Keiper | 308/200 |
| 1,543,039 | 6/1925 | Vervoort | 308/206 |
| 1,662,479 | 3/1928 | Smith | 308/244 |
| 2,683,379 | 7/1954 | Strandgren | 308/215 X |
| 4,037,893 | 7/1977 | Perrin | 308/205 |
| 4,040,689 | 8/1977 | Stanley | 308/205 |

Primary Examiner—Stuart S. Levy
Assistant Examiner—David Werner
Attorney, Agent, or Firm—Young & Thompson

[57] ABSTRACT

A rolling contact bearing comprises a central screw 1 threaded on its outside surface and a nut 13 threaded on its inside surface. Rollers 4 are disposed between screw 1 and nut 13 and have threads that are in mesh simultaneously with those of the screw and the nut. One end of nut 13 contains an internally toothed crown 14 whose toothing meshes with pinions 5 on rollers 4. An end ring 15 is pivoted on crown 14 between two flanges 16, 17 and has holes through which pass the trunions 18 of the rollers 4. An end of each trunion 18 has a part-spherical recess 19 receiving a ball 20, the balls 20 being maintained spaced apart by a cage 21. A ring 22 having a part-toroidal rolling path 23 is located above the balls 20, and a cover 24 is threaded in an end of nut 13 and permits setting under compression the roller-nut assembly in order to eliminate any play.

5 Claims, 5 Drawing Figures

ROLLING CONTACT BEARING WITH THREADED PLANET ROLLERS AND PLAY CANCELLING DEVICE

This application is a division of application Ser. No. 243.650, filed 3/17/81, now abandoned.

Swiss Pat. No. 290,685 discloses a roller bearing device to be used as screw and nut which comprises a female part and a male part which are coaxial and between which are located several threaded rollers. The threads of these rollers are engaged in threads provided on the internal face of the outer female part and on the outside face of the inner male part. The threads of these parts and of these rollers make constant angles with respect to a direction extending parallel to the longitudinal axis of the device. It is to be noted the threads of the rollers make the same angle with respect to the said direction as the threads of one of the two parts between which they are mounted; and to avoid any circumferential sliding movement of the rollers with respect to said part, this latter is provided at each of its ends with a toothed crown meshing with pinions fast in rotation with the corresponding ends of the rollers.

These roller devices greatly reduce the friction forces between the male and female parts; however, they have the major drawback of not being able to cancel the play occurring due to wear. Therefore the life of such devices is reduced with respect to what it could be if the axial precision of the movement could be ensured. Furthermore, in these devices, the toothing of the pinions fast with the rollers is located on the same diameter as the thread of these rollers. This toothing is therefore weakened by the thread which cuts or truncates a part of the teeth. These truncated pinions cause a rapid wearing off of the toothed crown with which they mesh, limiting also the life of these devices.

The object of the present invention is to overcome these drawbacks.

The attached drawings who schematically and by way of example an embodiment of the device according to the invention.

Figure 1:
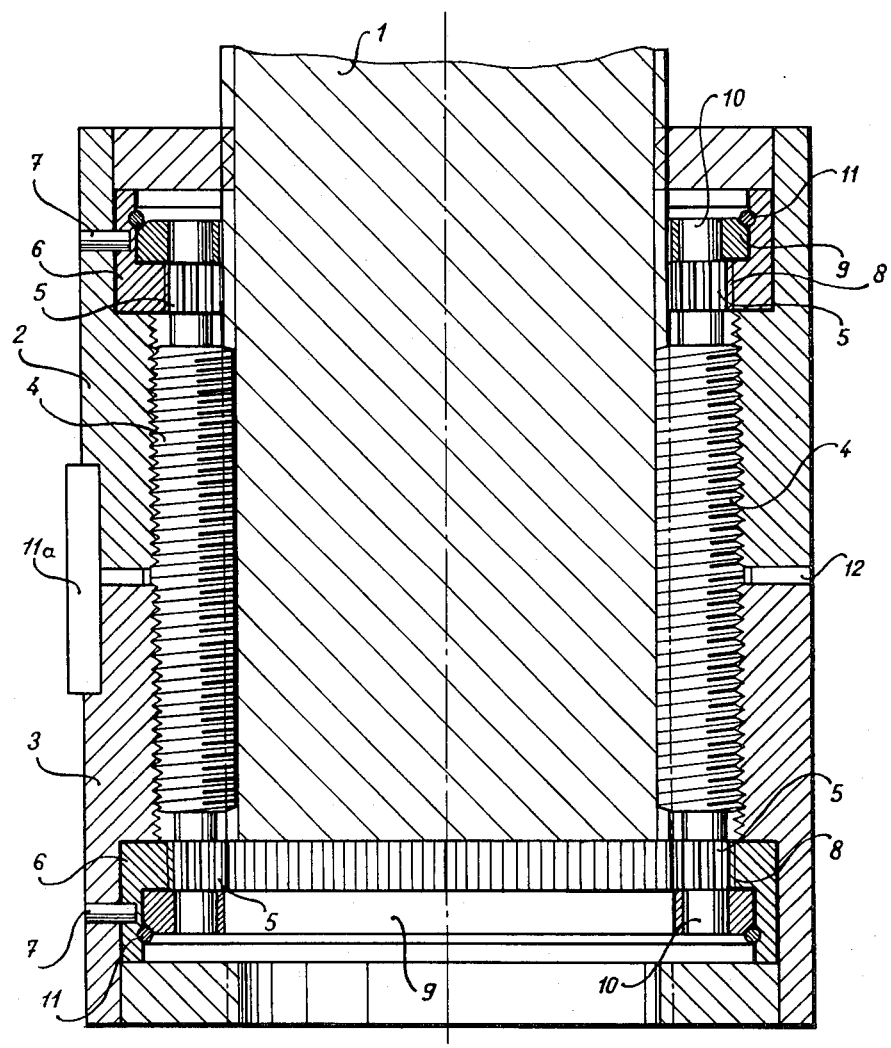
FIG. 1 is an axial cross section of a device of the type to which the present invention can be applied.
Figure 2:
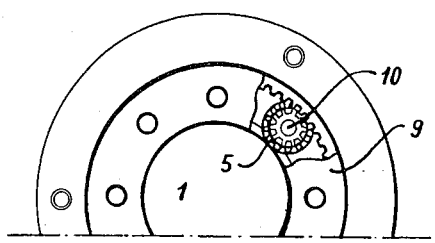
FIG. 2 is a partial end view of FIG. 1.

As shown in FIGS. 1 and 2, the roller bearing of the type to which the present invention can be applied, comprises an internal male part or screw 1 externally screw threaded and a female part 2 or 3 which is internally screw threaded.

A plurality of screw-threaded rollers 4 are located between these male and female parts, the threads of which mesh with the threads of these parts.

The threads of the male and female parts and of the rollers form a constant angle with respect to a direction extending parallel to the longitudinal axis of the device. Furthermore, the angles formed by the threads of the roller 4 and of the female part of parts with respect to this direction are identical.

Each end of each roller is secured to a pinion 5, the summit of the toothing of which is located on a diameter at most equal to the diameter of the bottom of the thread of the roller 4.

Sleeve 6, mounted on the female parts 2, 3 and fixed to them by means of pins 7, have an internal toothing 8 meshing with the toothing of the pinions 5 of the rollers 4.

In FIG. 1, end rings 9 are provided with holes in which the cylindrical ends 10 of the rollers 4 are located and set in position by means of resilient rings 11.

It will be evident that the screw 1, the nuts 2, 3 and the rollers 4 may have one or several threads.

In the FIG. 1 construction, the two nuts 2, 3 are connected by a cotter 11a fixing their relative angular position but permitting a relative axial displacement between these two nuts.

Also in the FIG. 1 construction, a pretensioning guage 12 is located between the two nuts 2, 3 and tends to separate them from each other. Thanks to this pretension, the play which could appear due to wearing of the threads is automatically cancelled. When the wear is great, and the initial pretension is no longer sufficient, the pretensioning guage 12 is replaced by a slightly thicker one reestablishing the normal pretension permitting again the automatic cancellation of play.

Figure 4:
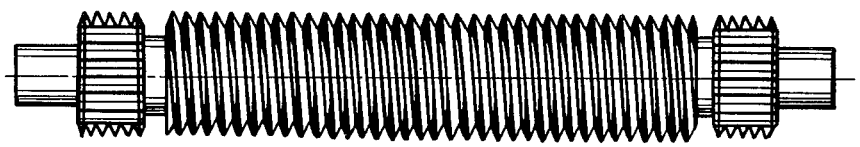
FIG. 4 shows a roller of a known roller device.
Figure 5:
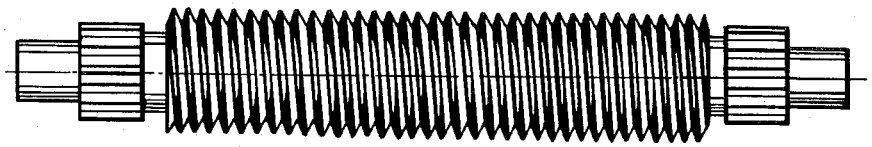
FIG. 5 shows a roller of the roller bearing according to the invention.

As mentioned above, the diameter of the pinion 5 is less than or at most equal to the diameter of the bottom of the thread of the rollers 4, as clearly seen in FIG. 5. Thus, the drawback of the known rollers, shown in FIG. 4, is eliminated. In those known rollers of FIG. 4, the teeth of the pinions are cut by the threads of the roller, and are therefore weakened and given a shape which causes the wearing off of the crown.

In the present device, the toothing of the pinions 5 and the crown 6 can have suitable shapes, for example an involute, so as to obtain favorable rolling conditions avoiding such wearing off. These are of course known in the art and need not be further described.

Such roller bearings function as a screw and nut having the advantages of very low friction, very low torque, and less inertia, but in which are avoided the drawbacks of the known devices by permitting a cancellation of the play and by reducing the wear of the pinions 5 and the crowns 6, thus increasing greatly the working life of these devices.

Figure 3:
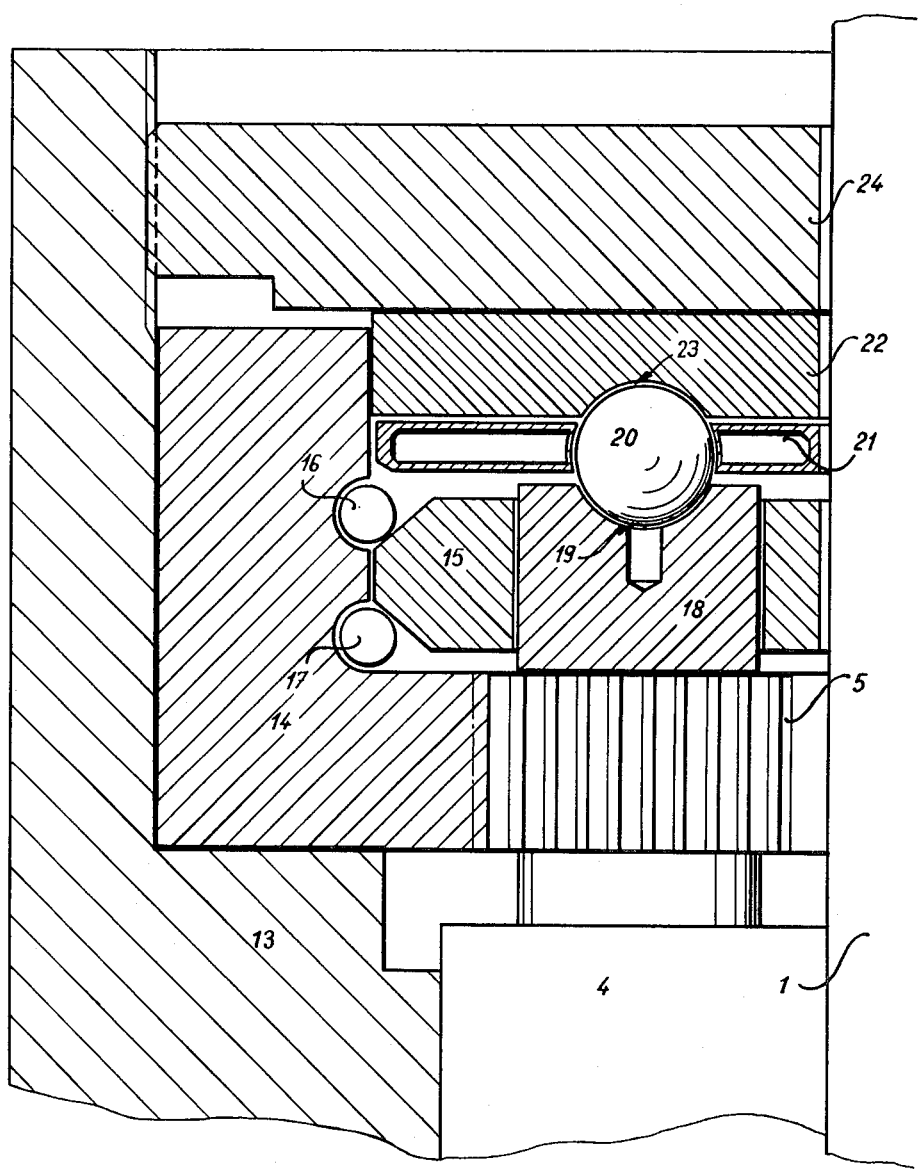
FIG. 3 is an enlarged fragmentary cross-sectional view showing the modification of a portion of the device of FIG. 1 according to the present invention.

According to the present invention now claimed, as shown in detail in FIG. 3, the roller bearing comprises also a screw 1 threaded on its outside surface and a nut 13 in only one part which is threaded internally. Rollers 4, similar to those of the first embodiment, are disposed between the screw 1 and the nut 13 and the threads of these rollers 4 are in mesh simultaneously with those of the screw and of the nut.

One of the ends of the roller bearing, the one which is not shown, is for example constructed identically to the corresponding end of the structure shown in FIG. 1.

The other end comprises a toothed crown 14 fixed and mounted in the nut 13, having internal toothing which meshes with the pinions 5 of the rollers 4.

An end ring 15 is pivoted on the crown 14 between two flanges 16, 17. This ring has holes through which pass the trunions 18 of the rollers 14.

The end face of each trunion 18 has a part-spherical recess 19 receiving a ball 20. A free cage 21 maintains these balls 20 in position. A ring 22 having a part-toroidal rolling path 23 is located above the balls 20. A cover 24 is threaded in the end of the nut 13 and permits setting under compression the roller-nut assembly in order to eliminate any play. Thanks to this device for cancelling the play, a simple rotation of the cover 24 relative to the nut 13 permits adjusting the precompression of the device as a function of its wear. Thus, the threads of the members 1, 4 and 13 will always be applied against each other with a given force, thereby causing the automatic cancellation of any play due to the wear of the threads.

It will be apparent to those skilled in this art that various changes and modifications can be made herein without departing from the spirit and scope of the present invention as defined by the apended claims.

I claim:

1. Roller bearing, working as screw and nut, comprising a female portion and a male portion which are coaxial and between which are located several threaded rollers the threads of which are in mesh with threads on the inside face of the female portion and on the outer face of the male portion, and in which the threads of said male and female portions and said rollers form constant angles with the longitudinal axis of the device, the threads of the rollers forming with respect to said axis the same angle as the threads of one of said male or female portions; said latter portion comprising at its end a toothed crown meshing with pinions fast with the ends of each roller; one end of each roller having a recess housing a ball; and screw-threaded means comprising a rolling path riding on said balls, said screw-threaded means being threaded onto the bearing for pressing against said balls thereby to cancel any play of said rollers.

2. Roller bearing according to claim 1, and a spacing cage disposed between the ends of the rollers and the ring in order to maintain the balls in spaced relationship.

3. Roller bearing according to claim 1, in which the diameter of the summit of the teeth of the pinions of the rollers is at most equal to the diameter of the bottom of the thread of these rollers.

4. Roller bearing according to claim 1, and an end ring surrounding said male portion and rotatable about its axis, an end of each roller being journalled in said end ring.

5. Roller bearing according to claim 1, in which said screw-threaded means comprises a ring bearing said rolling path and a cover threaded onto the bearing for pressing said ring against said balls.

* * * * *